US006464918B1

(12) United States Patent
Scherzer et al.

(10) Patent No.: US 6,464,918 B1
(45) Date of Patent: Oct. 15, 2002

(54) METHOD FOR PRODUCTION OF A SPIRAL-SHAPED HEATING ELEMENT

(75) Inventors: Joachim Scherzer, Bruchköbel (DE); Siegfried Grob, Hanau (DE)

(73) Assignee: Heraeus Noblelight GmbH, Hanau (DE)

( * ) Notice: Subject to any disclaimer, the term of this patent is extended or adjusted under 35 U.S.C. 154(b) by 0 days.

(21) Appl. No.: 09/385,851

(22) Filed: Aug. 30, 1999

(30) Foreign Application Priority Data

Aug. 29, 1998 (DE) ........................................ 198 39 457

(51) Int. Cl.[7] ................................................ B29C 71/00

(52) U.S. Cl. ........................ 264/235; 264/295; 264/344; 264/346

(58) Field of Search ................................ 264/235, 294, 264/295, 344, 346, 250; 219/553; 250/504 R

(56) References Cited

U.S. PATENT DOCUMENTS

| | | | | | |
|---|---|---|---|---|---|
| 2,771,386 | A | * | 11/1956 | Merz et al. | 174/110 R |
| 3,607,475 | A | * | 9/1971 | Schrewelius | 216/101 |
| 3,659,336 | A | * | 5/1972 | Horne | 264/266 |
| 3,841,920 | A | * | 10/1974 | Martin | 148/283 |
| 4,075,273 | A | * | 2/1978 | Liautaud | 264/250 |
| 4,272,673 | A | * | 6/1981 | Semanaz et al. | 219/528 |
| 4,500,430 | A | * | 2/1985 | Dasgupta | 210/321.72 |
| 4,774,396 | A | * | 9/1988 | Salit et al. | 219/533 |
| 4,987,675 | A | * | 1/1991 | Jackson et al. | 219/546 |
| 5,567,951 | A | | 10/1996 | Baschant et al. | |
| 5,895,212 | A | * | 4/1999 | Fujikura et al. | 264/234 |

FOREIGN PATENT DOCUMENTS

| | | |
|---|---|---|
| DE | 90 03 181 | 9/1990 |
| DE | 90 03 181.4 | 9/1990 |
| DE | 44 38 871 | 5/1996 |
| EP | 0 987 923 | 6/2001 |
| GB | 2 233 150 | 1/1991 |
| WO | WO 94/28693 | 12/1994 |
| WO | WO 99/22551 | 5/1999 |

* cited by examiner

*Primary Examiner*—Angela Ortiz
(74) *Attorney, Agent, or Firm*—Oblon, Spivak, McClelland, Maier & Neustadt, P.C.

(57) ABSTRACT

In the production of spiral-shaped heating elements, a device winds an oblong base material onto a mandrel while forming a spiral with the base material and equips the ends of the spiral with contacts for electrical connection. The device includes a feeding device for supplying the mandrel, onto whose casing surface the base material is wound in a spiral shape, with the oblong base material. In order to carry out a method for the production of a spiral-shaped heating element made of material containing carbon fibers, the method is as follows: utilize a base material that comprises carbon fibers which have been embedded into IBM a thermoplastic embedding compound, heat the base material to a temperature at which the embedding compound softens, wind the softened base material onto the mandrel while forming the spiral, and set the spiral shape by removing the embedding compound. On the device used to carry out the method, there is included a heating device which affects the base material in the area of the casing surface of the mandrel and can be adjusted to a temperature above the softening temperature of the embedding compound. The invented heating element, which distinguished itself due to its low thermal inertia and high radiation capacity at comparatively low temperatures, is formed in the shape of a spiral having a series of carbon fibers that are connected with each other.

4 Claims, 2 Drawing Sheets

METHOD FOR PRODUCTION OF A SPIRAL-SHAPED HEATING ELEMENT

CROSS REFERENCE TO RELATED APPLICATION

This application claims the benefit of priority under 35 U.S.C. §119 of German Patent Application Serial No. 198 39 457.8 filed on Aug. 29, 1998. Thus, the entire contents thereof are incorporated herein by reference.

BACKGROUND OF THE INVENTION

1. Field of the Invention

The invention concerns a method for the production of a spiral-shaped heating element, by winding an oblong base material onto a mandrel while forming a spiral with the base material and by equipping the spiral ends with contacts for electrical connection. Furthermore, the invention concerns a device for the production of a spiral-shaped heating element with a mandrel and with a device for feeding the oblong base material to the mandrel on whose casing surface the base material is wound in a spiral shape. Furthermore, the invention relates to a heating element for an infrared radiator, with the element being formed in a spiral shape with ends equipped with contacts for electrical connection. Additionally, the invention concerns an infrared radiator with a housing that encloses a spiral-shaped heating element. which is equipped with electrical connections.

2. Description of the Related Art

Infrared radiators are generally equipped with a heating coil, which consists of a metallic wire of high electric resistance. The heating coil is generated from plastic deformation of the metallic wire by winding it in a spiral shape onto a mandrel and subsequently removing the mandrel. The ends of the spiral produced this way are then equipped with metallic contact parts for electrical connection of the heating coil.

On prior art devices used for the production of such metallic heating coils, a mandrel is provided, which is fed the resistance wire continuously from a supply reel and which has a casing surface wound in a spiral shape. During the winding process, either the mandrel is moved in the direction of its longitudinal axis or the feeding mechanism of the wire is moved along the mandrel's longitudinal axis.

A heating element and an infrared radiator of the kind described above are prior art devices from German Utility Model No. 90-03181. On the infrared radiator described there, a heating coil that is wound in a spiral shape onto a carrier tube is provided within a jacket tube, with the spiral coil being hooked up to connecting lines for electrical connection purposes.

In British Patent No. 2,233,150, an infrared radiator has the heating element made in the shape of a carbon strip that is arranged within a quartz glass tube, which is closed on both ends. The carbon strip consists of a number of graphite fibers that are arranged parallel to each other and have the shape of a strip. For the purpose of electrical connection, the carbon strip is equipped on both sides with metallic end caps. Generally, the front ends of the carbon strip are pinched into these end caps. The caps are connected with a spirally bent metallic wire, which in turn is connected with the electrical duct that reaches through the closed ends of the jacket tube.

A similar infrared radiator is described in German Patent No. 4,419,285. The heating element in this infrared radiator consists of a carbon strip that is arranged in a meandering shape. with the strip being formed by several connected partial sections with ends fastened on supports.

The carbon strip allows quick temperature changes so that prior art infrared carbon radiators excel through their high reaction speed. However, according to the Stefan-Boltzmann law, the radiation capacity of a radiating body decreases considerably with decreasing temperatures so that the radiation capacity of prior art carbon strips is low at comparatively low temperatures of the heating element, e.g. below 1000° C.

In its original condition, the carbon strip consists of composites. A variety of fine carbon fibers is set mechanically within a thermoplastic embedding compound, such as resin. Only limited plastic deformation can be achieved on the carbon strip in this condition so that the prior art method and device for the production of a spiral-shaped heating element made of this material are not suitable.

SUMMARY OF THE INVENTION

The invention relates to a method and a device for the production of a spiral-shaped heating element made of material that contains carbon fibers. Furthermore, the invention relates to a heating element that, on the one hand, excels due to its low thermal inertia and, on the other hand, provides a high radiation capacity at comparatively low temperatures. The invention also relates to an infrared radiator that is produced by utilizing such a heating element.

As far as the manufacturing procedure for the heating element is concerned, the task is resolved by the invented method described above with a base material that comprises carbon fibers, which are encased into a thermoplastic embedding compound, by warming the base material to a temperature that softens the embedding compound, winding the softened base material onto the mandrel while forming a spiral, and setting the spiral shape by removing the embedding compound.

The invented method allows the production of spiral-shaped heating elements made of a base material that contains carbon fibers to be possible. Due to the spiral shape, the surface of the heating element produced in this way is considerably larger than the surface of a cylindrical, oblong heating element of the same length. The larger surface in turn leads to higher radiation capacity of the heating element at those temperatures.

The base material is initially available in an oblong shape, for example, as a thread or a strip. By warming the base material to a temperature at which the embedding compound softens, a state is reached that allows plastic deformation of the base material. The base material is shaped in the warmed state by winding it onto the mandrel in a spiral shape. The spiral shape created in this way is then set. This setting is achieved through complete or partial removal of the embedding compound, thus avoiding or reducing subsequent plastic deformation of the heating element during its intended usage in an infrared radiator. Upon complete or partial removal of the embedding compound, the spiral shape is still maintained. Removal can occur through chemical reactions, for example, through reaction with a solvent or by vaporization or pyrolysis (thermal decomposition).

A preferred version of the method includes removal of the embedding compound through annealing of the spiral to a temperature and in an atmosphere at which the embedding compound is converted into volatile matter. Conversion into volatile matter occurs through vaporization or decomposition of the embedding compound or through reactions with components of the surrounding atmosphere. Volatile components can be removed easily.

Heating of the spiral should preferably occur without oxygen, for example, in a closed reactor, inert gas, or in a vacuum. This way oxidation of the carbon fibers is avoided.

The base material can be warmed either across its entire length or in sections. It has been proven beneficial to warm the base material continuously in sections across its length, with the respectively softened section being wound onto the mandrel. Winding of the base material turns out to be especially simple if the mandrel rotates at the same time around its longitudinal axis.

The mandrel can also be warmed to a temperature that exceeds the softening temperature of the embedding compound, either across its entire length or in sections.

The preferred shape for the base material is a strip. A heating spiral that has been produced with strip-shaped base material distinguishes itself through a particularly large surface, and thus high radiation capacity.

In light of this fact, the utilization of strips proved particularly beneficial if the thickness was between 0.1 mm and 0.5 mm and the width was between 2 mm and 20 mm.

With regard to the fixture used to execute the method, the above-mentioned task is resolved by providing a heating device that affects the base material in the area of the casing surface of the mandrel for production of a spiral-shaped heating element made of a base material that comprises carbon fibers, which are encased into a thermoplastic embedding compound. This heating device can be adjusted to a temperature above the softening temperature of the embedding compound.

The base material is warmed to a temperature above the softening temperature for the embedding compound through a heating device. By allowing the heating device to affect the base material in the area of the casing surface of the mandrel, the base material is softened in the respective sections that are fed to the mandrel in such a way that the base material reaches a state of plastic deformation and can be wound in a spiral shape onto the casing surface of the mandrel. Transfer of the heat from the heating device onto the base material can occur through contacts, radiation, current, or convection. The heating element can affect the base material directly or indirectly through interposition of a device for transmission. It is important only that the heating device affects the base material in the area of the casing surface of the mandrel.

A device whose design allows the mandrel to rotate around its longitudinal axis and on which the heating device can be moved relative to the mandrel proved to be beneficial. In order to be able to wind the base material in a spiral shape onto the rotating mandrel, either the mandrel itself is moved in the direction of its longitudinal axis or the base material is guided continuously along the casing surface of the mandrel via the feeding device. In the first case, the heating and feeding devices can be fixed locally; in the latter, the heating and feeding devices can be moved along the longitudinal axis of the mandrel. With the ability to move the mandrel and the heating device relative to each other, a specific and locally limited warming process of the base material can be achieved.

The warming process of the base material is particularly simple and exact when using a version of the invented device where the heating device can be moved with the help of a linear guiding mechanism that runs parallel to the longitudinal axis of the mandrel.

It is beneficial to equip the feeding device with a first driving mechanism, with which it can be moved in a direction that is parallel to the longitudinal axis of the mandrel, with a second driving mechanism, which is coupled electrically or mechanically to the first driving mechanism, being provided to be able to move the heating device. By coupling the two driving mechanisms together, the movements of the heating device and the feeding device can be synchronized, thus enabling exact local warming of the base material.

A heating device that includes a hot air fan proved particularly advantageous.

With regard to the spiral-shaped heating element, the above task is resolved by the fact that the element consists of a certain layout of carbon fibers that are connected with each other.

At the same length, the surface of the spiral-shaped heating element is considerably larger than the surface of the prior art, oblong, strip-shaped heating element. At a given temperature, the larger surface leads to comparatively higher radiation capacity. The invented heating element therefore excels also due to its lower thermal inertia while simultaneously offering high radiation capacity, which becomes noticeable especially at comparatively low temperatures.

In this respect, it is particularly beneficial if the heating element is formed as a spiral-shaped carbon strip. The spiral shape of the heating element allows it to increase its surface by up to three times that of the prior art, oblong, strip-shaped carbon strip.

Should the base material used for production of the invented heating element be a composite that comprises a number of fine carbon fibers, which are fixed mechanically in a thermoplastic embedding compound, such as a resin, then the base material is preferably brought into a spiral shape and set in accordance with the above-described procedure.

The invented infrared radiator includes a housing that encloses a spiral-shaped heating element, which is equipped with electrical connections, as described above. The spiral-shaped heating element is produced from a base material that contains carbon fibers. Such an infrared radiator distinguishes itself from others due to a high radiation capacity, especially in wavelength ranges of 1.5 $\mu$m to 4.5 $\mu$m.

The following description provides more detailed explanations of the invention with the help of an example of one version.

BRIEF DESCRIPTION OF THE DRAWINGS

The drawings show in detail the following diagrammatic views.

DETAILED DESCRIPTION OF THE INVENTION

Figure 1:
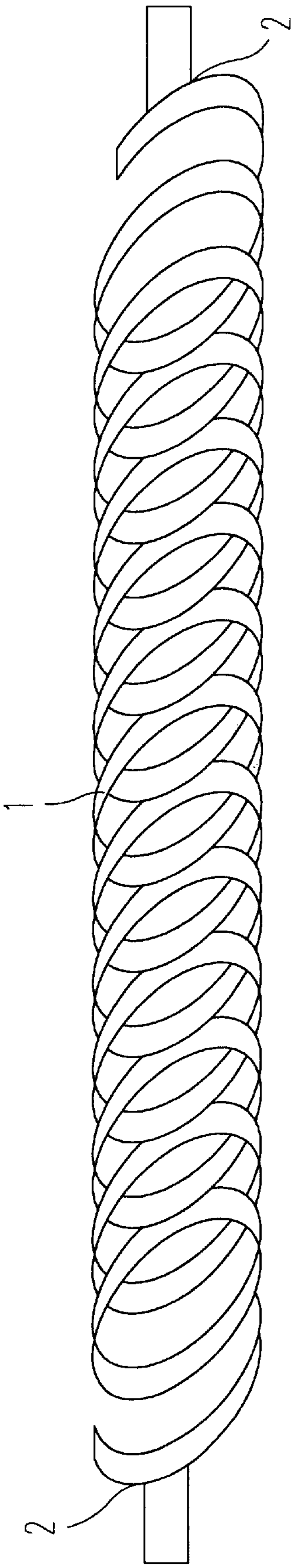
FIG. 1 shows a spiral-shaped carbon radiation strip for an infrared radiator in accordance with the invention.

The spiral-shaped radiation strip shown in FIG. 1 consists of a carbon strip 1 of a thickness of 0.15 mm and a width of 5 mm. The ends of the carbon strip 1 are equipped with metallic contacts 2 for electrical connection. The spiral formed by the carbon strip 1 has a diameter of about 10 mm. The distance to neighboring spirals is approximately 5 mm. The carbon strip 1 is produced from a carbon fiber/resin composite, with the resin being removed during the course of the production process.

Figure 2:
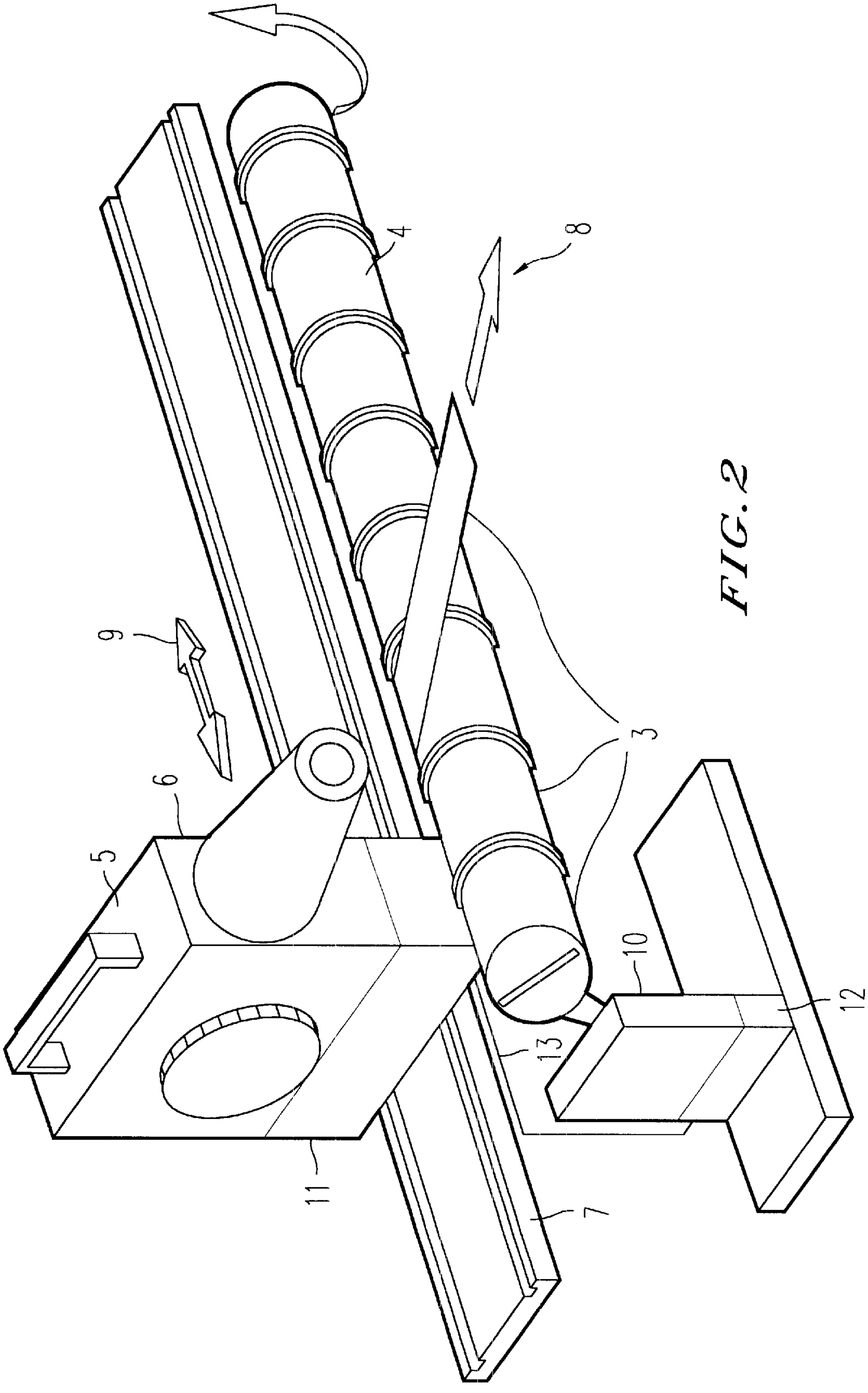
FIG. 2 shows a strip winding device for production of the spiral-shaped carbon radiation strip.

FIG. 2 shows a strip-winding device for producing the spiral-shaped carbon radiation strip seen in FIG. 1. The strip-winding device comprises a shaft 4 with a diameter of 10 mm. This shaft 4 which can be rotated around its longitudinal axis and is fed strip-shaped carbon fiber/resin composite material 3 continuously via a feeding device 10 that is wound onto the casing surface of the shaft 4 in a spiral shape. In order to ensure that the shaft 4 rests evenly on top, the strip-shaped carbon fiber/resin composite material 3 is subjected to tensile stress and is held in place that way, in a direction indicated by an arrow 8. During the winding process onto the shaft 4, the carbon fiber/resin composite material 3 is heated in sections with a hot air fan 5.

To accomplish this heating, a nozzle 6 of the hot air fan 5 is directed, respectively, to that section of the carbon fiber/resin composite material 3 which is being fed to the shaft 4. The hot air fan 5 is mounted onto a rail 7, which is arranged parallel to the longitudinal axis of the shaft 4. The hot air fan 5 can be moved parallel to the casing surface of the shaft 4 along the rail 7 with a drive motor 11 in the direction of an arrow 9.

The following describes the invented method for production of the spiral-shaped heating element in more detail with reference to FIGS. 1 and 2.

The strip-shaped carbon fiber/resin composite material 3 is fed continuously to the shaft 4. which rotates at a speed of 2 RPM, and is wound onto the shaft 4 in a spiral shape. The spiral shape results from the continuous side-ways shift of the winding area along the shaft 4, with the speed of the shift being determined by the rotational speed and the circumference of the shaft 4 and the distance of neighboring turns to each other. In the version according to FIG. 2, the desired spiral shape of the strip-shaped carbon fiber/resin composite material 3 or of the carbon strip 1 is supported by appropriate structuring of the casing surface of the shaft 4. In the winding area, the hot air fan 5 generates a temperature at which the resin of the carbon fiber/resin composite material 3 softens. This softening leads to a state in which the material 3 allows plastic deformation and thus winding in the spiral shape. The temperature required depends on the embedding material that is utilized. With the resin used in the example, the temperature was approximately 300° C. The direction and speed of movement for the hot air fan 5 on the rail 7 along the shaft 4 and that of the shift of the winding area for the strip-shaped carbon fiber/resin composite material 3 are in agreement. This way the hot air fan 5 always heats only that section of the strip-shaped carbon fiber/resin composite material 3 that is wound onto the shaft 4 immediately thereafter.

A motor 12 drives the feeding device 10 parallel to the longitudinal axis of the shaft 4 while the motor 11 drives the hot air fan 5 in the direction indicated by the arrow 9 parallel to the longitudinal axis of the shaft 4. The motor 11 is coupled electrically or mechanically with the motor 12 by a line 13.

After allowing the carbon fiber/resin composite material 3 to cool on the shaft 4, its spiral-shaped structure is maintained. For setting it completely, the spiral that has been produced this way is annealed subsequently at a temperature of about 1000° C. in a nitrogen atmosphere. During this process, the majority of the embedding material, in this case the resin, evaporates or decomposes into gaseous components. The spiral-shaped layout of the carbon fibers, however, is maintained so that after the annealing process the spiral-shaped carbon strip shown in FIG. 1 is obtained.

The spiral-shaped carbon strip in FIG. 1 distinguishes itself from the oblong shape of the prior art carbon strip through a surface that is about three times larger (at the same length). This increased surface area leads to an increase in radiation capacity, which becomes particularly noticeable at lower temperatures of below 1000° C. The spiral-shaped carbon strip is therefore especially suited for the production of an infrared radiator made according to the invention.

The following discussion describes one version of the invented infrared radiator in more detail. The infrared radiator has a medium wave range for wavelengths around 2.5 μm. The jacket tube used here is a quartz glass tube that has been pinched closed on both ends and evacuated so that it encloses a spiral-shaped carbon strip. The carbon strip is depicted in FIG. 1 and the method for its production is explained in more detail above with reference to FIGS. 1 and 2. The carbon strip is equipped with electrical connections, which are guided out via the two pinched ends. The infrared radiator excels due to its high radiation capacity and low thermal inertia.

Clearly, numerous modifications and variations of the present invention are possible in light of the above teachings. Therefore, it is to be understood that, within the scope of the appended claims, the invention may be practiced otherwise than as specifically described herein.

What is claimed is:

1. Method for production of a spiral-shaped heating element, by winding an oblong base material onto a mandrel while forming a spiral with the base material and by equipping ends of the spiral with contacts for electrical connection, wherein the base material includes carbon fibers which have been encased into a thermoplastic embedding compound, said method comprising the steps of:

warming the base material to a temperature at which the embedding compound softens;

winding the warm base material onto the mandrel while forming the spiral; and setting the spiral shape by removing the embedding compound;

wherein removing the embedding compound includes annealing the spiral with a temperature and an atmosphere that converts the embedding compound into volatile matter.

2. Method according to claim 1 further comprising the step of: annealing in the absence of oxygen.

3. Method according to claim 1 further comprising the step of: warming the base material continuously in sections throughout its entire length and thereafter winding the respective length, after warming, onto the mandrel.

4. Method according to claim 1 further comprising the step of: warming the mandrel to a temperature that exceeds a softening temperature of the embedding compound.

* * * * *